Patented Aug. 19, 1924.

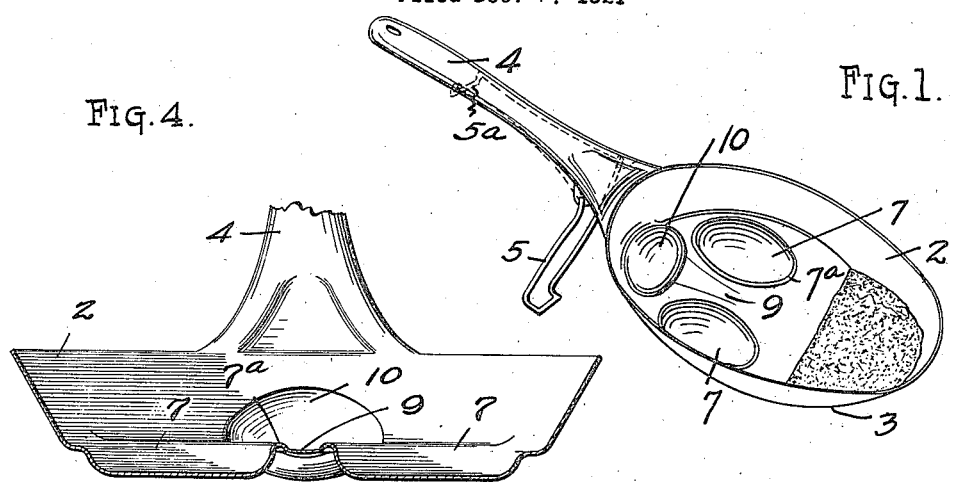
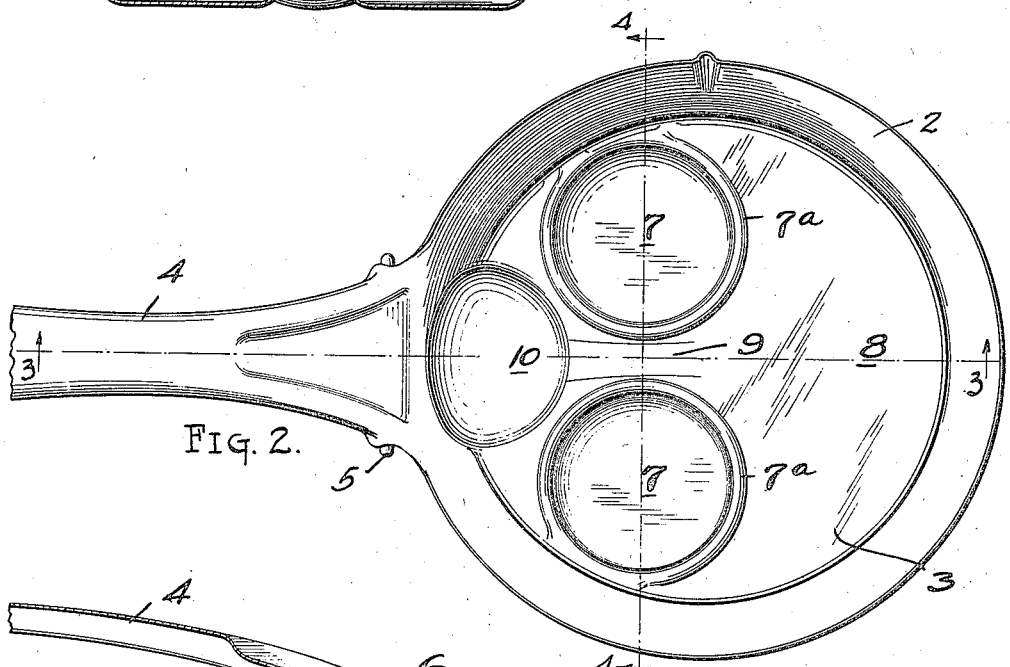
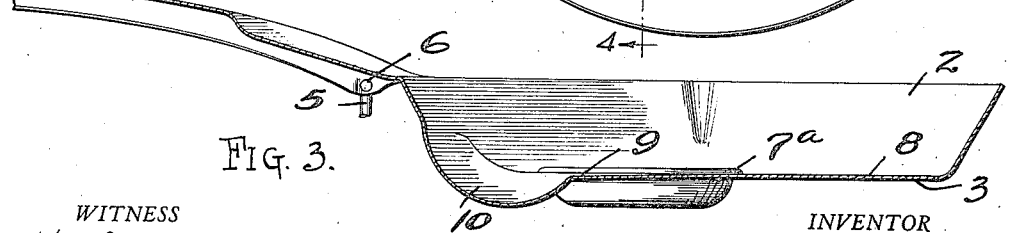

1,505,675

UNITED STATES PATENT OFFICE.

CHARLES STIRN, OF SAN FRANCISCO, CALIFORNIA.

COOKING UTENSIL.

Application filed December 7, 1921. Serial No. 520,510.

*To all whom it may concern:*

Be it known that I, CHARLES STIRN, a subject of the Grand Duchess of Luxemburg, and a resident of the city and county of San Francisco, State of California, have invented a new and useful Cooking Utensil, of which the following is a specification.

This invention relates to cooking utensils and more particularly to frying pans.

An object of the present invention is to provide a frying pan designed for concurrent cooking of separate objects and substances of food, each being maintained in a separate condition while being cooked. A further object is to provide for the thorough and uniform cooking of objects of food, such for instance, as poultry eggs, and thereby to eliminate the tendency of over-cooking or burning the extended marginal portion of an egg in the process of frying and obtaining a uniformly fried mass.

Another object of the invention is to provide a frying pan in which one or more eggs may be cooked at the same time that another food substance, such as ham or bacon is being fried and it is an object to provide for the collection of the fats from the frying meat so that it can be collected and poured over other objects being cooked or may be prevented entirely from mixing with the other objects being cooked in the pan. A further object is to provide means for holding the pan in a given position to facilitate the frying or cooking of a food substance without necessitating the holding of the pan manually at a certain position during the process.

The invention possesses other objects and features of advantage, some of which, with the foregoing, will be made manifest in the following description of the preferred form of the invention, which is illustrated in the drawings accompanying and forming part of the specification. It is to be understood that it is not intended to limit the invention to the embodiment shown by the said drawings and description, as variations may be adopted within the scope of the invention, as set forth in the claims.

Figure 1 is a perspective of the improved pan set in position for cooking a substance at a lower side of the pan.

Fig. 2 is a plan view of the pan.

Fig. 3 is a sectional view on line 3—3 of Fig. 2, and

Fig. 4 is a sectional view on line 4—4 of Fig. 2.

My present invention is incorporated in a frying pan of suitable size and material and preferably has incorporated integrally in its structure a series of depressions, each for separately holding a substance to be cooked and one of which forms a pocket into which the gravy or melted fats from meat, for instance, may be collected.

It is well known in the frying of eggs that because of the spreading laterally of the egg substance, the thinner marginal portion fries quickly and may burn before the thicker central portion, including the yolk, is cooked to the desired degree. It is desirable to provide a pan in which the egg substance will be so confined as to eliminate the spreading of the marginal portion and preserve the egg substance at a substantially uniform thickness of mass and thus provide an even cooking throughout without necessitating the movement of the pan with the consequent destruction of the yolk mass.

A preferred form of device is shown, as including a pan having a flange 2, upstanding from the bottom 3; a suitable handle being extended, as at 4, from one side of the pan. In some cases it is desirable to cook a small quantity of food substance evenly and to a certain condition and this is facilitated, in the present case, by providing a foldable leg 5, which may consist of wire with ends pivoted at 6 in the sides of the handle adjacent to the rim of the flange so that the leg 5 can be swung down to a supporting position, as indicated in Fig. 1, and in which position the pan is inclined to a suitable degree to cause the fluid or semi-fluid food mass to collect in the lowermost portion in the basin formed by the flange and the bottom. When the member 5 is not utilized as a leg, it is thrown to the position shown in dotted lines at 5ª; the side members of the leg 5 preferably resiliently gripping the sides of the handle 4, so that the leg will remain in retracted position by frictional attachment to the handle.

To secure the frying of eggs and other substance in the desired uniform manner, the bottom 3 of the pan is provided with a plurality of depressions 7—7 of suitable depth and diameter to provide a holding capacity about equal to the volume of a good sized poultry egg, so that when such an egg is deposited in either of the depressions 7, it will be confined to a substantially uniform thickness of mass and will therefore cook or fry equally when the pan is subjected to the heat. The depressions or pockets 7 are shown as, and are preferably, circular, and the depressions are arranged with their centers to one side of a diameter of the bottom, thus leaving a considerable flat area 8 of the bottom which may be utilized for the cooking of some other substance, while an egg or eggs are being fried in the recesses. The recesses 7 are separated from each other to form a drain groove or gutter indicated at 9 leading from the frying area 8 back to a grease collecting pocket 10 provided in the bottom 3. Preferably the margins of the recesses 7 are beaded or embossed peripherally, upwardly, as at 7ª to prevent the gravy, grease or other liquid on the surface 8 from draining into the egg frying recesses 7.

Preferably all of the depressed portions 7 and 10 are integral with the sheet metal body of the frying pan and are of substantially equal depth, though it is to be understood that the depressions may be otherwise secured, if desired.

The arrangement of a pair of depressions 7 and the pocket 10, in a manner as here shown, somewhat to one side in the bottom of the pan 3, renders the pan balanced, as upon the tripod-like support formed by the three depressed portions, since the handle at one side of the pan and the projecting portion of the pan beyond the transverse line passing through the recesses 7—7 tend to balance each other and the pan remains stable when set on a level.

From the above it will be seen that if the pan is placed in a level position over a heating medium, meats, vegetables, cakes, eggs and other food substances may be cooked in separate respective portions of the frying pan, all at one time, and without the substances becoming intermixed. For instance, a meat may be fried upon the plane surface 8 of the bottom 3, an egg may be cooked in one of the recesses 7 and a potato or a pancake may be cooked in the other recess, while the pocket 10 may be utilized either for the cooking of a substance or it may be utilized to receive the grease or gravy that may result in the cooking of a substance on the plane surface 8 of the bottom of the pan. During cooking, in some cases, it may be desirable to collect the grease with a spoon from the pocket 10 and this grease or gravy applied to the substance being cooked in either or both of the recesses 7.

A very important advantage of the present frying pan is that it is only necessary to use one fire hole or one gas burner to heat the pan in which there may be cooking different batches of material.

What is claimed is:

1. A frying pan having a plurality of substantially separate depressions for separately containing substances of food to be cooked; said depressions being arranged all substantially to one side of a diameter of the bottom of the pan so as to provide a serviceable undepressed cooking area of the bottom of the pan, certain of the depressions having their rims at an elevation above the normal bottom of the pan to prevent inflow of liquids into the depressions.

2. A frying pan having a plurality of substantially separate depressions for separately containing substances of food to be cooked; said depressions being arranged all substantially to one side of a diameter of the bottom of the pan so as to provide a serviceable, undepressed cooking area of the bottom of the pan, certain of the depressions having their rims at an elevation above the normal bottom of the pan to prevent inflow of liquids into the depressions, and one of the depressions being adapted to receive liquid from the top plane of the bottom of the pan.

3. A frying pan having on one end of a diameter of its bottom a liquid receiving pocket; the bottom of the pan at the opposite end of the diameter providing a cooking surface from which liquid may gravitate into said pocket, and a plurality of cooking depressions provided in the bottom of the pan and having their rims at an elevation above the bottom to prevent inflow of liquid into the depression.

In testimony whereof, I have hereunto set my hand.

CHARLES STIRN.